(12) United States Patent
Kawahara et al.

(10) Patent No.: US 6,838,517 B2
(45) Date of Patent: Jan. 4, 2005

(54) METHOD FOR PRODUCING ETHYLENE-VINYL ACETATE COPOLYMER AND SAPONIFIED PRODUCT THEREOF

(75) Inventors: Takaharu Kawahara, Okayama (JP); Tetsuya Hikasa, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/892,543

(22) Filed: Jun. 28, 2001

(65) Prior Publication Data

US 2002/0040107 A1 Apr. 4, 2002

(30) Foreign Application Priority Data

Jun. 29, 2000 (JP) ........................................ 2000-195495

(51) Int. Cl.$^7$ ............................................... C08F 16/06
(52) U.S. Cl. ....................... 525/61; 525/60; 525/330.3; 525/330.6; 526/330; 526/331
(58) Field of Search ................. 525/61, 330.6, 525/60, 330.3, 330; 526/330, 331

(56) References Cited

U.S. PATENT DOCUMENTS

| | | | | |
|---|---|---|---|---|
| 2,703,794 A | * | 3/1955 | Roedel | 526/93 |
| 2,910,461 A | * | 10/1959 | Nowlin et al. | 526/77 |
| 2,935,500 A | * | 5/1960 | Nowlin et al. | 526/124.1 |
| 2,971,952 A | * | 2/1961 | Batty et al. | 526/209 |
| 2,983,696 A | * | 5/1961 | Tocker | 525/61 |
| 3,109,837 A | * | 11/1963 | Lockheed et al. | 526/77 |
| 3,115,485 A | * | 12/1963 | Bartl et al. | 526/212 |
| 3,404,177 A | * | 10/1968 | Baba et al. | 203/14 |
| 3,454,542 A | * | 7/1969 | Cheape, Jr. et al. | 526/341 |
| 3,513,142 A | | 5/1970 | Blumberg et al. | |
| 4,576,988 A | * | 3/1986 | Tanaka et al. | 264/500 |
| 4,772,663 A | * | 9/1988 | Marten et al. | 525/60 |
| 5,310,790 A | * | 5/1994 | Sato et al. | 525/56 |
| 5,403,905 A | * | 4/1995 | Sato et al. | 526/210 |
| 5,744,547 A | | 4/1998 | Moritani et al. | |
| 5,866,655 A | | 2/1999 | Fujiwara et al. | |
| 6,288,165 B1 | | 9/2001 | Moritani et al. | |

FOREIGN PATENT DOCUMENTS

| | | |
|---|---|---|
| EP | 0 275 081 | 7/1988 |
| EP | 0 389 833 | 10/1990 |
| JP | 45-3388 | 2/1970 |

* cited by examiner

*Primary Examiner*—Judy M. Reddick
(74) *Attorney, Agent, or Firm*—Oblon, Spivak, McClelland, Maier & Neustadt, P.C.

(57) ABSTRACT

The present invention provides methods for producing an ethylene-vinyl acetate copolymer and a saponified product thereof that can inhibit visible imperfections (particularly discoloration) at the time of molding by improving the process for recovering vinyl acetate. When the alcohol-based solvent to be blown in when recovering vinyl acetate is deoxidized so that its oxygen concentration becomes not more than 60 ppm, discoloration of a molded product of the above saponified product due to oxygen can be inhibited.

18 Claims, 1 Drawing Sheet

METHOD FOR PRODUCING ETHYLENE-VINYL ACETATE COPOLYMER AND SAPONIFIED PRODUCT THEREOF

FIELD OF THE INVENTION

The present invention relates to methods for producing an ethylene-vinyl acetate copolymer and a saponified product thereof.

BACKGROUND OF THE INVENTION

Saponified ethylene-vinyl acetate copolymers (hereinafter referred to as "EVOH") are excellent in melt moldability, gas barrier properties, water resistance, oil resistance, antistatic property and mechanical strength, and are used as various types of packages in the form of a film, a sheet, a container or the like. In these packages, visible imperfections generated at the time of molding, e.g. discoloration, fish eyes, rough surfaces, etc., are significant problems that should be overcome.

On the other hand, to reduce production cost, it is desirable to recover and reuse unreacted materials and used solvents in the process of producing EVOH. Particularly, in the production of EVOH on commercial scale, it is desirable to recover unreacted vinyl acetate from a solution after copolymerizing ethylene and vinyl acetate (for example, see JP 45(1970)-3388B).

DISCLOSURE OF THE INVENTION

In the past, in the process of recovering vinyl acetate, no improvement has been proposed for inhibiting the visible imperfections generated at the time of molding. Thus, it is desirable to provide methods for producing an ethylene-vinyl acetate copolymer and a saponified product thereof that inhibit visible imperfections at the time of molding by improving the process for recovering vinyl acetate.

The inventors have found that the oxygen contained in the alcohol-based solvent used when recovering vinyl acetate contributes to the above-mentioned visible imperfections, thus completing the present invention.

The present invention provides a method for producing an ethylene-vinyl acetate copolymer, which method comprises copolymerizing ethylene and vinyl acetate in an alcohol-based solvent and recovering unreacted vinyl acetate from a solution after copolymerizing, wherein the solution is introduced into a recovery column through an upper portion thereof, a vapor of an alcohol-based solvent for vinyl acetate recovery is introduced into the recovery column through a lower portion thereof, a solution including an ethylene-vinyl acetate copolymer is taken out of the recovery column through a lower portion thereof, and unreacted vinyl acetate in the solution is taken out of the recovery column with the vapor of the alcohol-based solvent through an upper portion thereof, wherein the oxygen concentration in the alcohol-based solvent to be introduced into the recovery column is not more than 60 ppm (by weight throughout, unless otherwise stated), more preferably not more than 30 ppm.

The present invention also provides a method for producing EVOH, which includes saponifying an ethylene-vinyl acetate copolymer obtained by the above-mentioned method.

BRIEF DESCRIPTION OF THE DRAWING

The single drawing is a sectional view showing an example of a recovery column for vinyl acetate, used in the methods of the present invention.

DESCRIPTION OF THE PREFERRED EMBODIMENT

Figure 1:
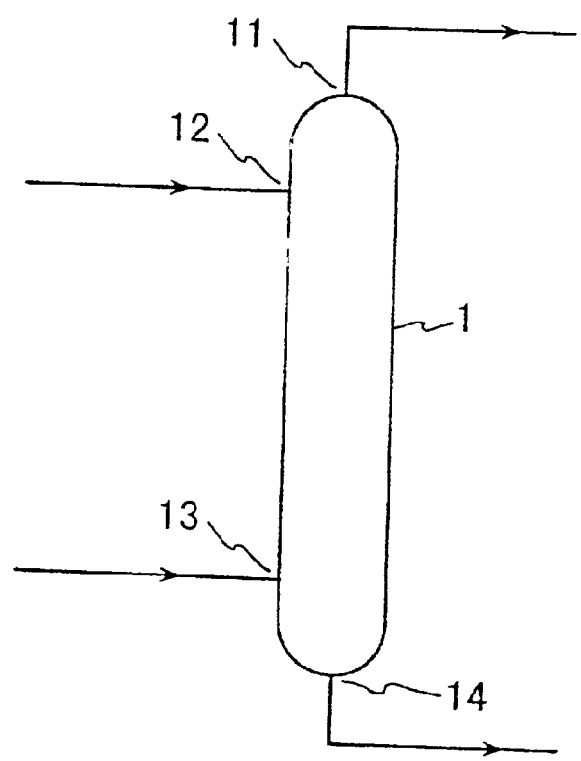

In the following, a preferred embodiment of the present invention is described.

In the present invention, an alcohol-based solvent having an oxygen concentration of not more than 60 ppm, preferably not more than 30 ppm, more preferably not more than 10 ppm, is used in the recovery of vinyl acetate. Such a low oxygen concentration can be attained by deoxidizing the alcohol-based solvent. In the present specification, "deoxidizing" is used to indicate a treatment for reducing the concentration of oxygen dissolved in a liquid.

Although various methods may be used for the deoxidizing of the alcohol-based solvent, bubbling of the solvent with an inert gas, addition of an oxygen absorbent, or the like, are effective. Particularly, bubbling with nitrogen gas is simple and easy and also is advantageous in terms of cost, so that it is suitable for deoxidizing an alcohol-based solvent.

By reducing the oxygen concentration in the alcohol-based solvent, visible imperfections of EVOH molded products, particularly discoloration, can be inhibited. The effect of such a trace of oxygen on coloration is peculiar to EVOH. It is considered that oxygen facilitates dehydration of EVOH and causes discoloration.

The ordered steps in an example of the methods of the present invention will be described below.

For the copolymerization of ethylene and vinyl acetate, any of solution polymerization, suspension polymerization, emulsion polymerization and bulk polymerization may be used, but solution polymerization is preferred. Either a continuous type or a batch type method may be employed.

As the alcohol-based solvent, alcohols having 1 to 4 carbon atoms such as methanol, ethanol, n-butanol and t-butanol are suitable, and methanol is particularly suitable. A mixed solvent of two or more alcohols also may be used. As long as the alcohol-based solvent includes an alcohol as a major component, it may also include other minor components.

It is preferable that the alcohol-based solvent used in the copolymerization also is deoxidized in advance. It is preferable that the oxygen concentration in the alcohol-based solvent used in the copolymerization is not more than 15 ppm, particularly not more than 5 ppm.

As a catalyst, any radical initiator may be used without particular limitation. Preferred catalysts are azonitrile-based initiators such as 2,2'-azobisisobutyronitrile, 2,2'-azobis-(2,4-dimethylvaleronitrile), 2,2'-azobis-(4-methyl-2,4-dimethylvaleronitrile), 2,2'-azobis-(4-methoxy-2,4-dimethylvaleronitrile) and 2,2'-azobis-(2-cyclopropylpropionitrile); and organic peroxide-based initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide and t-butyl hydroperoxide.

Monomers copolymerizable with ethylene and vinyl acetate also may be present together with ethylene and vinyl acetate. Such monomers include (i) α-olefins such as propylene, isobutylene, α-octene and α-dodecene; (ii) unsaturated acids such as acrylic acid, methacrylic acid, crotonic acid, maleic acid and itaconic acid, salts thereof, and anhydrides or mono-or dialkyl esters thereof; (iii) nitriles such as acrylonitrile and methacrylonitrile; (iv) amides such as acrylamide and methacrylamide; (v) olefin sulfonic acids such as ethylene sulfonic acid, allyl sulfonic acid and methallyl sulfonic acid, or salts thereof. Other monomers such as alkyl vinyl ethers, vinyl ketone, N-vinylpyrrolidone, vinyl chloride, vinylidene chloride and the like also may be present. However, it is preferable that these third monomers are added to such an extent that the effects of the present invention are not inhibited.

Considering the characteristics of EVOH, it is preferable that the ethylene content in the copolymer is at least 20 mol % but not more than 70 mol %. When the ethylene content is too low, sufficient water resistance cannot be obtained. Conversely, when the ethylene content is too high, sufficient gas barrier properties cannot be obtained. From these viewpoints, it is more preferable that the ethylene content is from 25 to 60 mol %. Moreover, when the copolymer is used as a coating material or the like, the ethylene content may be less than 20 mol %.

It is preferable that the polymerization temperature is at least 50° C. but not more than 80° C., and the pressure of the gaseous phase (ethylene pressure) in the polymerization vessel is from 20 to 80 kg/cm$^2$. In the case of batch type, it is preferable that the reaction time is from 3 to 24 hours. In the case of continuous type, it is also preferable that the average residence time is in about the same range. It is preferable that the polymerization degree is about 30 to 80%, based on vinyl acetate.

Next, a polymerization inhibitor is added to a solution containing an ethylene-vinyl acetate copolymer (copolymer solution), and unreacted ethylene gas is evaporated and removed from the copolymer solution. Further, unreacted vinyl acetate is extracted from the copolymer solution and recovered. The vinyl acetate can be recovered, for example, using a recovery column filled with Raschig ring.

In the following, an embodiment of the recovery of vinyl acetate is described with reference to FIG. 1.

The copolymer solution, which contains unreacted vinyl acetate, is continuously fed into a recovery column 1 through an upper portion 12 thereof. On the other hand, a vapor of an alcohol-based solvent is continuously blown into the recovery column through a lower portion 13 thereof. As the alcohol-based solvent for blowing into the recovery column, the above exemplified alcohols, particularly methanol, are preferred. Thus, while taking unreacted vinyl acetate out of the recovery column through a top portion 11 thereof with the vapor of the alcohol-based solvent and recovering it, the copolymer solution from which unreacted vinyl acetate has been removed is taken out of the column through a bottom portion 14 thereof.

When the oxygen concentration in the atmosphere within the recovery column is high, discoloration of EVOH molded products cannot be inhibited sufficiently. Mainly, oxygen intrudes into the inside of the recovery column with the alcohol-based solvent blown into the column. Therefore, discoloration of molded products can be inhibited by deoxidizing the alcohol-based solvent in advance.

The mixture solution taken out of the recovery column through a top portion thereof also includes the alcohol-based solvent contained in the copolymer solution along with unreacted vinyl acetate and the alcohol-based solvent blown into the column. This mixture solution is introduced into another treatment column, and vinyl acetate is separated from the mixture solution by extractive distillation with water, and it is taken out of the treatment column as a mixed solvent solution of alcohol and water. Furthermore, by separating and purifying this water/alcohol mixture solution, an alcohol-based solvent can be recovered. The unreacted vinyl acetate and the alcohol-based solvent thus recovered are reused in the copolymerization. The alcohol-based solvent recovered also is reused in the above-mentioned recovery of vinyl acetate.

An alkali catalyst is added to the copolymer solution from which unreacted vinyl acetate has been removed, and an acetic acid ester component of the ethylene-vinyl acetate copolymer is saponified. The saponification may be carried out by a method of either continuous type or batch type. As the alkali catalyst, sodium hydroxide, potassium hydroxide, alkaline metal alcoholate or the like may be used. For example, when the saponification is carried out by a batch type method, it is preferable that the temperature of the copolymer solution is at least 30° C. but not more than 65° C., and the reaction time is from 1 to 6 hours. It is preferable that the concentration of the copolymer solution is from 10 to 50%, and the amount of the catalyst used is from 0.02 to 1.0 equivalent with respect to an acetic acid ester component. Because the obtained saponified product (EVOH) contains an alkali catalyst, by-product salts and other impurities, these are neutralized and washed as needed.

It is preferable that the saponification degree of the EVOH is at least 90 mol %, more preferably at least 95 mol %, still more preferably at least 99 mol %. When the saponification is insufficient, sufficient gas barrier properties may not be obtained. Moreover, for example, in order to improve the interlayer adhesion or the like, the saponification degree also may be about 80 to 95 mol %. The EVOH with this saponification degree may be used alone, but it also may be used as a blend with an EVOH having a saponification degree of at least 99 mol %.

It is preferable that the melt index (MI) of the EVOH is from 0.1 to 200 g/10 min. As the MI, a measured value at 190° C. and under a load of 2160 g is used. However, with respect to an EVOH having a melting point of around 190° C. or exceeding 190° C., a plurality of measured values under the above-specified load and at temperatures of not less than the melting point are plotted as a semi-logarithmic graph with the inverse of the absolute temperature on the horizontal axis and MI on the vertical axis (logarithmic scale), and a value extrapolated at 190° C. is used as the MI.

The EVOH thus obtained is molded into various forms such as films, sheets, containers, pipes, fibers and the like by melt molding. Melt molding may be effected by extrusion molding, inflation, blow molding, melt spinning, injection molding, etc. It is preferable that the melting temperature is from 150 to 270° C. A blend of at least two kinds of EVOH different in polymerization degree, ethylene content, saponification degree and the like may be melt molded. Furthermore, plasticizers, stabilizers, surfactants, crosslinking agents, metal salts, fillers, reinforcing agents such as various types of fibers, etc. may be added to the EVOH in advance.

A thermoplastic resin other than EVOH may be mixed with the EVOH. Examples of the thermoplastic resin include polyolefins (polyethylene, polypropylene, poly-1-butene, poly-4-methyl-1-pentene, ethylene-propylene copolymers, copolymers of ethylene and an α-olefin having at least 4 carbon atoms, copolymers of a polyolefin and maleic anhydride, ethylene-vinyl acetate copolymers, ethylene-acrylic acid ester copolymers, modified polyolefins in which these polyolefins are grafted with an unsaturated carboxylic acid or its derivative, etc.), various types of nylons (nylon 6, nylon 66, nylon 6/nylon 66 copolymers, etc.), polyvinyl chloride, polyvinylidene chloride, polyester, polystyrene, polyacrylonitrile, polyurethane, polyacetal, modified polyvinyl alcohol resin, and the like.

Furthermore, the EVOH may be formed into a laminate, for example, by coextruding the EVOH with a thermoplastic resin such as those exemplified above. Furthermore, the EVOH may be formed into a laminate with a substrate film such as paper, plastic film, metal foil or the like, and may be coated on the surface of these substrate films by coextrusion coating, solution coating or the like.

EXAMPLES

In the following, the present invention will be described in more detail with reference to the following non-limiting examples. In these examples, oxygen concentrations were measured by gas chromatography.

Example 1

Using a polymerization vessel with an agitator having a capacity of 100 L and including a cooling coil within the vessel, continuous copolymerization of an ethylene-vinyl acetate copolymer was carried out under the following conditions:

| | |
|---|---|
| Feed rate of vinyl acetate: | 5.0 kg/hour |
| Initiator: | 2,2'-azobis(2,4-dimethylvaleronitrile) |
| Feed rate of initiator: | 0.3 L/hour (as a methanol solution of 2.8 g/L) |
| Polymerization temperature: | 60° C. |
| Ethylene pressure in the polymerization vessel: | 45 kg/cm$^2$ |
| Average residence time: | 7 hours |
| Solvent: | methanol |

The methanol used as a solvent was deoxidized by nitrogen bubbling in advance, and its oxygen concentration was decreased to not more than 1 ppm.

A polymerization reaction solution (copolymer solution) drawn from the polymerization vessel continuously through a bottom portion thereof was sampled, and its composition was analyzed. The results are shown below.

| | |
|---|---|
| Ethylene-vinyl acetate copolymer (ethylene content of 34 mol %): | 46 wt % |
| Vinyl acetate: | 32 wt % |
| Ethylene: | 8.7 wt % |
| Methanol: | 10 wt % |
| Others: | 3.3 wt % |

The polymerization degree of vinyl acetate was 55%.

After adding β-myrcene as a polymerization inhibitor to the polymerization reaction solution (copolymer solution) which was drawn from the polymerization vessel continuously through a bottom portion thereof, ethylene was flash evaporated and removed from the copolymer solution. The concentration of the ethylene-vinyl acetate copolymer in the copolymer solution, from which ethylene was removed, was 28 wt %.

This copolymer solution was fed at a rate of 1.2 t/hour into a recovery column (bubble-cap tower) with a diameter of 0.85 m and having 20 steps through an upper portion thereof. On the other hand, methanol vapor was blown into the bubble-cap tower through a lower portion thereof at a rate of 600 L/hour, and unreacted vinyl acetate was taken out of the tower through a top portion thereof with part of the methanol. Thus, a methanol solution of an ethylene-vinyl acetate copolymer was obtained through a lower portion of the tower at a rate of 0.75 t/hour. In this methanol solution, the copolymer concentration was 45 wt %.

The methanol blown into the tower had been deoxidized by nitrogen bubbling in advance so that the oxygen concentration in the methanol was decreased to 10 ppm.

Furthermore, the ethylene-vinyl acetate copolymer contained in the methanol solution from which vinyl acetate had been separated was saponified, and further melt molded according to the following steps:

First, 1 weight part of sodium hydroxide was added to 100 weight parts of the methanol solution. The copolymer was saponified while blowing a methanol vapor at 110° C. and at 343.4 kPa (3.5 kg/cm2). Methyl acetate formed as a by-product was distilled with a part of methanol, and expelled from the system. Further, a vapor of water/methanol was blown into the solution of the saponified product (EVOH) obtained to distill the solvent, and an EVOH solution (methanol/water=65/35; weight ratio) having a polymer concentration of 35 wt % was obtained.

Next, this EVOH solution was discharged into a coagulation liquid (methanol/water=10/90; weight ratio) at 5° C. through a die with apertures of 2 mm in diameter, and coagulated in the form of strands. The strands were cut by a cutter so as to obtain pellets with a length of 2.5 to 3.5 mm. These pellets were washed with 15 weight parts of water with respect to 1 weight part of the pellets, and deliquored. Furthermore, the washed pellets were treated with an aqueous solution of acetic acid and sodium dihydrogenphosphate, deliquored and dried. Thus, EVOH pellets having a saponification degree of 99.5 mol % and a MI of 2.1 g/10 min (load of 2160 g, temperature of 190° C.) were obtained. The yellow index of these pellets was measured according to JIS K 7103. As a result, the yellow index was 9, and the hue was fine and white.

Example 2

Except that the oxygen concentration in the methanol fed into the tower through a lower portion thereof was 20 ppm, polymerization, saponification and pelletization were carried out in the same manner as in Example 1 to obtain EVOH pellets. The yellow index of these pellets was measured according to JIS K 7103. As a result, the yellow index was 13, and the hue was fine and white.

Comparative Example 1

Except that a methanol not deoxidized (with an oxygen concentration of 80 ppm) was fed into the tower through a lower portion thereof, polymerization, saponification and pelletization were carried out in the same manner as in Example 1 to obtain EVOH pellets. The yellow index of these pellets was measured according to JIS K 7103. As a result, the yellow index was 20, and the hue was yellowish.

As described above in detail, according to the present invention, visible imperfections of a molded product can be inhibited by improving the process of recovering unreacted vinyl acetate.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A method far producing an ethylene-vinyl acetate copolymer, comprising:

copolymerizing ethylene and vinyl acetate in an alcohol-based solvent, so as to form a solution containing said ethylene-vinyl acetate copolymer; and recovering unreacted vinyl acetate from said solution after copolymerizing;

wherein said solution is introduced into a recovery column through an upper portion thereof, a vapor of an alcohol-based solvent is introduced into said recovery column through a lower portion thereof, a solution comprising ethylene-vinyl acetate copolymer is taken out of said recovery column through a lower portion thereof, and unreacted vinyl acetate in the solution is taken out of said recovery column with the vapor of the alcohol-based solvent through an upper portion thereof;

wherein said alcohol-based solvent, the vapor of which is introduced into said recovery column, is deoxidized in advance of being introduced into said recovery column and an oxygen concentration in said alcohol-based solvent is not more than 60 ppm.

2. The method according to claim 1, wherein said oxygen concentration is not more than 30 ppm.

3. The method according to claim 1, wherein an oxygen concentration in said alcohol-based solvent for copolymerizing is not more than 15 ppm.

4. A method for producing a saponified ethylene-vinyl acetate copolymer, comprising:

copolymerizing ethylene and vinyl acetate in an alcohol-based solvent to obtain a solution containing an ethylene-vinyl acetate copolymer;

recovering unreacted vinyl acetate from said solution after copolymerizing; and saponifying said ethylene-vinyl acetate copolymer;

wherein said solution is introduced into a recovery column through an upper portion thereof, a vapor of an alcohol-based solvent is introduced into said recovery column through a lower portion thereof, a solution comprising said ethylene-vinyl acetate copolymer is taken out of the recovery column through a lower portion thereof, and unreacted vinyl acetate in the solution is taken out of said recovery column with the vapor of the alcohol based solvent through an upper portion thereof, wherein said alcohol-based solvent, the vapor of which is introduced into said recovery column, is deoxidized in advance of being introduced into said recovery column and an oxygen concentration in said alcohol-based solvent is not more than 60 ppm.

5. The method according to claim 4, wherein a saponification degree of said saponified ethylene-vinyl acetate copolymer is at least 90 mol %.

6. The method according to claim 4, wherein said oxygen concentration is not more than 30 ppm.

7. The method according to claim 4, wherein an oxygen concentration in said alcohol-based solvent for copolymerizing is not more than 15 ppm.

8. The method according to claim 1, wherein said alcohol-based solvent is deoxidized in advance of said copolymerizing.

9. The method according to claim 4, wherein said alcohol-based solvent is deoxidized in advance of said copolymerizing.

10. The method according to claim 1, wherein said alcohol-based solvent is deoxidized in advance of said recovering.

11. The method according to claim 4, wherein said alcohol-based solvent is deoxidized in advance of said recovering.

12. The method according to claim 1, wherein said alcohol-based solvent comprises a member selected from the group consisting of alcohols having 1 to 4 carbon atoms and mixtures thereof.

13. The method according to claim 4, wherein said alcohol-based solvent comprises a member selected from the group consisting of alcohols having 1 to 4 carbon atoms and mixtures thereof.

14. The method according to claim 1, wherein said ethylene-vinyl acetate copolymer further comprises, in copolymerized form, a comonomer selected from the group consisting of α-olefins, unsaturated acids, salts of unsaturated acids, anhydrides of unsaturated acids, monoalkyl esters of unsaturated acids and dialkyl esters of unsaturated acids, ethylenically unsaturated nitriles, ethylenically unsaturated amides, olefin sulfonic acids, salts of olefin sulfonic acids, alkyl vinyl ethers, vinyl ketone, N-vinylpyrrolidone, vinyl chloride and vinylidene chloride.

15. The method according to claim 4, wherein said ethylene-vinyl acetate copolymer further comprises, in copolymerized form, a comonomer selected from the group consisting of α-olefins, unsaturated acids, salts of unsaturated acids, anhydrides of unsaturated acids, monoalkyl esters of unsaturated acids and diallcyl esters of unsaturated acids, ethylenically unsaturated nitriles, ethylenically unsaturated amides, olefin sulfonic acids, salts of olefin sulfonic acids, alkyl vinyl ethers, vinyl ketone, N-vinylpyrrolidone, vinyl chloride and vinylidene chloride.

16. The method according to claim 1, wherein an ethylene content of said ethylene-vinyl acetate copolymer is at least 20 mol % but not more than 70 mol %.

17. The method according to claim 4, wherein an ethylene content of said ethylene-vinyl acetate copolymer is at Least 20 mol % but not more than 70 mol %.

18. The method according to claim 4, wherein a melt index of said saponified ethylene-vinyl acetate copolymer is from 0.1 to 200 g/10 min, as measured at 190° C. under a load of 2160 g.

* * * * *